United States Patent [19]
Reinmöller et al.

[11] 4,186,904
[45] Feb. 5, 1980

[54] ADJUSTABLE MOTOR VEHICLE SEAT

[75] Inventors: Adolf Reinmöller, Remscheid; Hans W. Voss, Wuppertal; Bernd Klüting, Radevormwald, all of Fed. Rep. of Germany

[73] Assignee: Keiper Automobiltechnik GmbH & Co. KG, Remscheid-Hasten, Fed. Rep. of Germany

[21] Appl. No.: 833,334

[22] Filed: Sep. 14, 1977

[30] Foreign Application Priority Data

Sep. 14, 1976 [DE] Fed. Rep. of Germany ....... 2641243

[51] Int. Cl.² ........................ A47C 1/02; A47D 19/04
[52] U.S. Cl. .................... 248/395; 248/420; 297/329
[58] Field of Search .............. 248/393, 395, 397, 419, 248/420, 429, 430; 297/317, 318, 322, 329, 330

[56] References Cited

U.S. PATENT DOCUMENTS

| 2,072,411 | 3/1937 | Smelker | 248/395 |
| 2,161,367 | 6/1939 | McGregor et al. | 248/395 X |
| 3,167,297 | 1/1965 | Lohr | 248/419 |
| 3,286,971 | 11/1966 | Walter et al. | 248/429 |

FOREIGN PATENT DOCUMENTS

| 2255122 | 5/1974 | Fed. Rep. of Germany | 248/393 |
| 995133 | 6/1965 | United Kingdom | 248/397 |

*Primary Examiner*—Lawrence J. Staab
*Attorney, Agent, or Firm*—Michael J. Striker

[57] ABSTRACT

An adjustable seat of a motor vehicle has a mounting arrangement at each of its lateral regions. The respective mounting arrangement includes an elongated carrier, a support rail which is connected to the seat proper and is displaceable longitudinally of the carrier, and a pivot which mounts the carrier, which extends in the front-to-rear direction, for tilting along a vertical plane. A drive and a driving section of a transmission are mounted on the carrier, the driving section including two pinions which are simultaneously driven by the drive and one of which meshes with a driven rack rigidly connected to the support rail, while the other pinion meshes with another driven rack which is provided at one side of an elongated slot in a support element for the seat proper and is curved having its center of curvature on the axis of the above-mentioned pivot. The drive and the transmission displace the seat proper in a proportionate and mutually dependent fashion so that each tilted position of the carrier has associated therewith a single position of the support rail with respect to the carrier. The two mounting arrangements at the two lateral regions of the seat are similarly configured and the corresponding pinions at the two lateral regions are interconnected by shafts for rotation in unison.

11 Claims, 4 Drawing Figures

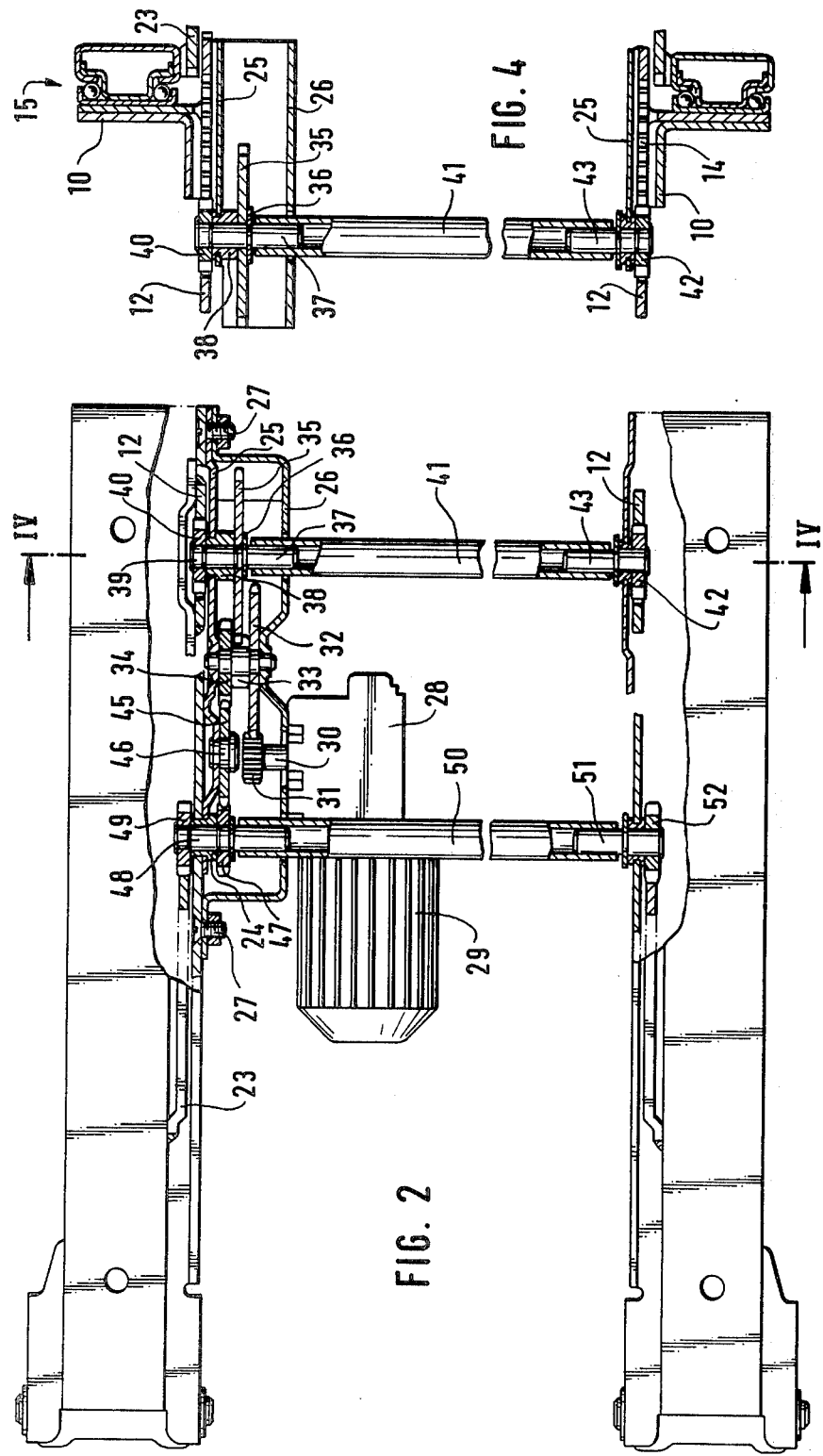

ADJUSTABLE MOTOR VEHICLE SEAT

BACKGROUND OF THE INVENTION

The present invention relates to an adjustable seat in general, and more particularly to an adjustable seat to be used in a motor vehicle. Still more particularly, the present invention is concerned with an adjustable seat the seat element of which is displaceable along an elongated carrier arrangement which is tiltable along a vertical plane.

There is already known, from the U.S. Pat. No. 3,079,118, a seat for motor vehicles which is adjustable by means of an electromotoric drive, wherein an electromotor can be coupled, by means of electromagnetically controlled couplings, with three adjusting mechanisms of which one performs the longitudinal adjustment of the seat element relative to an elongated guide, another one takes care of the adjustment of the elevation of the front region of the guide, and the third one provides for the adjustment of the elevation of the rear region of the guide. Arrangements of this type are very expensive, primarily because of the required numerous components of the various mechanisms, and assume a substantial amount of space. In addition thereto, the operation of this arrangement, when the adjustment of the position of the seat element is to be accomplished in a desired and predetermined manner, requires that the user of the seat devotes a considerable part of, if not entire, attention to the performance of this task.

From the U.S. Pat. No. 2,953,190, there is known an electromotorically adjustable seat for use in motor vehicles in which an electromotor drives a pinion at each of the two lateral regions of the seat, each by means of a flexible shaft. Then, each of the pinions meshes with a toothed rack which is connected to the seat element to displace the seat element along a stationary guide which is arcuate over its length. This arrangement possesses an inordinately and disadvantageously great height of construction, which renders it impossible to use a seat of this type in a wide variety of motor vehicles, particularly in sports cars and the like.

SUMMARY OF THE INVENTION

Accordingly, it is a general object of the present invention to avoid the disadvantages of the prior art.

More particularly, it is an object of the present invention to so construct a mounting and displacing arrangement for an adjustable vehicle seat as not to be possessed of the disadvantages of the prior-art vehicular seats of this type.

Yet another object of the present invention is to so construct the mounting and displacing arrangement as to require only a minimum amount of space underneath the seat, at least in its collapsed position.

A concomitant object of the present invention is to so construct the mounting and displacing arrangement as to be simple in construction, inexpensive to manufacture and assemble, and reliable in operation nevertheless.

A still another object of the present invention is to devise an adjustable seat for use in a motor vehicle and the mounting and displacing arrangement thereof which leaves nothing to be desired as far as safety standards and loading capacity of the seat are concerned.

In pursuance of these objects and others which will become apparent hereafter, one feature of the present invention resides, in an adjustable seat, particularly for use in a motor vehicle, briefly stated, in a combination which comprises a seat element having a central plane, a pair of lateral regions each extending along said plane at one side thereof and with a spacing therefrom, a front region, and a rear region; means for mounting said seat element for displacement parallel to said plane, including first mounting means which is elongated and extends along said plane in a front-to-rear direction, and second mounting means which mounts said first mounting means for tilting parallel to said plane; and means for displacing said seat element parallel to said plane, including advancing means which advances said seat element longitudinally of said first mounting means frontly and rearwardly, and tilting means which tilts said first mounting means upwardly and downwardly to vary the angle of inclination thereof. Advantageously, said displacing means further includes means for interconnecting said advancing and tilting means for proportionate and mutually dependent displacement. Such interconnecting means may include a drive, and a transmission interposed between said drive and said advancing and tilting means, respectively, and operative for jointly and simultaneously displacing both said advancing and tilting means. The drive is, to advantage, a motor, and preferably an electromotor.

When the seat is constructed in the above-mentioned manner, a single raised position of the seat element is associated with each of the longitudinal positions of the seat element because of the coupling of the advancing and tilting means. In this connection, it is recommended to leave the front region of the seat element at substantially the same level regardless of the longitudinal position of the seat element, that is, to perform the adjustment of the elevational position of the seat element exclusively or at least predominantly at the rear region of the seat element. It is sufficient to provide a substantially straight-line mounting and guiding arrangement for the seat element, the orientation of the elongation of which changes in a predetermined ratio to the longitudinal position of the seat element. This renders it possible not only to keep the height of the arrangement to a minimum, but also to minimize the length of the arrangement without sacrificing the reliability thereof. So, there is always available a sufficient region of support for the guidance of the seat element which renders it possible to freely adjust the position of the seat element even under the least advantageous circumstances.

The above-discussed basic concept of the present invention can be realized in various ways. In an advantageous and currently preferred embodiment of the present invention, the first mounting means includes an elongated carrier and a support rail connected to the seat element for joint displacement therewith along said carrier, and the transmission includes a driving section which has a driving pinion and a driven rack, the drive and the driving section being mounted on the carrier and the driven rack being attached to the support rail for shared displacement therewith. Furthermore, the second mounting means includes a stationary support element and the tilting means further includes an additional driven rack rigid with the support element and extending substantially vertically. Then, the driving section includes an additional driving pinion also mounted on the carrier and meshing with the additional driven rack. The adjustment of the position of the seat element by means of toothed racks renders it possible to keep the overall dimensions to a minimum, while maintaining the loading capacity of the arrangement at a high level.

Preferably, the support element is elongated and extends parallel to the above-mentioned plane. Then, the additional driven rack is arranged at one end of the support element, while a pivot of the second mounting means is mounted at the other end of the support element and the additional driven rack is curved and has a center of curvature located on the pivot axis of the pivot. Instead of the curved rack, it would, however, also be possible to utilize a straight-toothed rack serving the purpose of adjusting the inclination of the carrier, but such toothed rack would then have to be tiltably mounted on the stationary support element. It is further recommended, especially when the driven rack which forms a part of the means for tilting the carrier is curved, to provide the support element with an elongated slot, and to arrange the additional driven rack at one side of the slot so as to delimit the latter. In this manner, it is assured, in a simple manner, that the additional pinion and the additional rack will remain in a meshing engagement with one another even when substantial permanent deformations come into being such as, for instance, during a collision or the like.

Under usual circumstances, it will be advantageous to arrange the above-discussed mounting means and displacing means at each of the lateral regions of the seat element. Then, the present invention proposes the provision of means of synchronously operating the advancing means and tilting means of both of these displacing means. Advantageously, the operating means includes a first shaft which is common to the driving pinions of both advancing means, and a second shaft common to the additional driving pinions of the two tiling means, the shafts extending transversely of and across the above-mentioned plane. Under these circumstances, it is merely necessary to provide the drive and most of the driving section of the transmission only at one lateral region of the seat element, while assuring that the adjusting forces are uniformly applied at both lateral regions of the seat element so that the danger of jamming or edging of the seat element in its guiding arrangement is largely eliminated.

In order to also assure the optimum security of the meshing engagement of the driving pinion and driven rack which together determine the longitudinal position of the seat element, it is further proposed according to an additional feature of the present invention to equip the carrier with a support extension rigid therewith which embraces the driven rack at a region of meshing with the driving pinion and which maintains the rack in a meshing engagement with the driving pinion. Preferably, the driven rack has an abutment surface which extends longitudinally thereof and faces away from the driving pinion, and then the support extension has an abutment portion which is juxtaposed with the abutment surface at the meshing region.

The transmission which couples the tilting and advancing means with one another and with the driving motor can also be constructed in a variety of ways. However, in a currently preferred embodiment of the present invention, the above-mentioned driving section of the transmission includes a reduction gear pair, two gear wheels driven by the reduction gear pair and coupled with one another for joint rotation, a first auxiliary gear jointly rotatable with the additional driving pinion and driven by one of the two gear wheels, a second auxiliary gear driven by the other of the two gear wheels, a third auxiliary gear wheel jointly rotatable with the driving pinion, and an intermediate gear interposed between and meshing with the second and third auxiliary gear wheels. In the driving section, there could be incorporated a releasable coupling so as to render it possible to adjust the seat element at least in its longitudinal position even in the event of malfunction of either the drive or a part of the transmission.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a sectional view taken on line II—II of FIG. 1;

FIG. 4 is a sectional view taken on line IV—IV of FIG. 2.

DETAILED DESCRIPTION OF THE PREFERRED EMBODIMENTS

Figure 1:
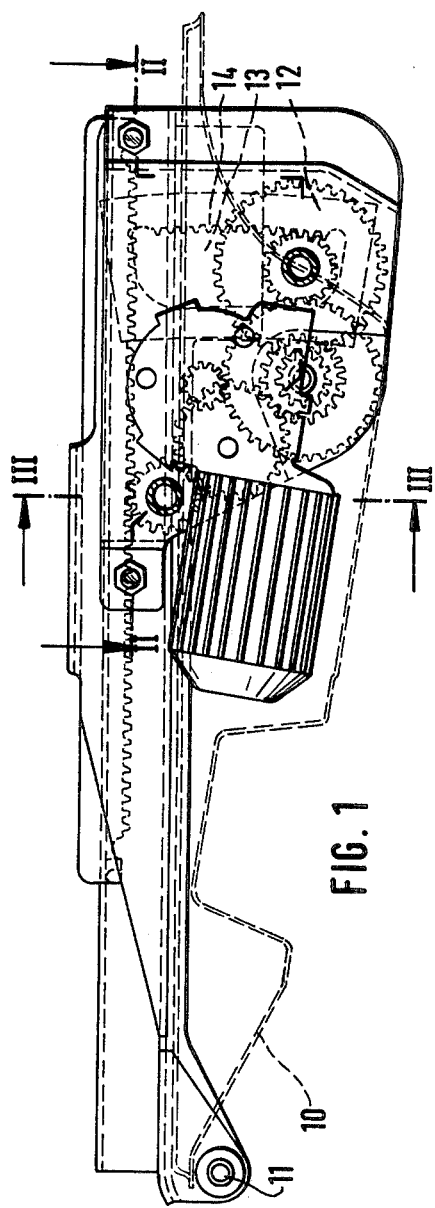
FIG. 1 is a side elevational view of the arrangement of the present invention for mounting and adjusting the position of the seat element in a motor vehicle.
Figure 3:
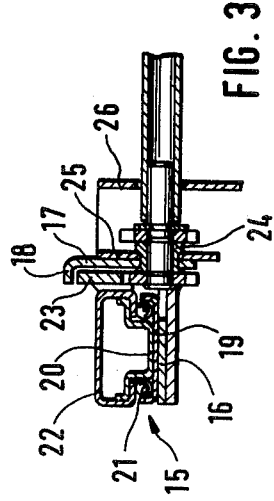
FIG. 3 is a fragmentary section taken on line III—III of FIG. 1.

Referring now to the drawing in detail, and first to FIG. 1 thereof, it may be seen that the reference numeral 10 has been used to designate a support element which is, when the adjustable seat of the present invention is mounted in a motor vehicle, rigidly connected to the floor or another part of the body of the motor vehicle. A horizontally extending pivot 11 is mounted on the front region of the support element 10 at each of the lateral sides of the seat. The two pivots 11 associated respectively with the lateral regions of the seat are coaxial and extend transversely of the longitudinal direction of the motor vehicle in the mounted position of the seat.

The support element 10 is further equipped, at its rear region as considered in the mounted position of the seat, and at each of the lateral regions of the latter, with a toothed rack 12 which is constituted by an elongated slot 13 which is delimited at one of its longer sides by a tooth segment 14. The toothed segment 14 is arcuate and has a radius of curvature commencing at the axis of the pivot 11.

Each pivot 11 mounts a carrier layer 15 on the support element 10 for pivoting in a vertical plane. The carrier rail 15 includes a carrier consisting of a horizontal arm 16 and a vertical arm 17. The vertical arm 17 extends only over a portion of the length of the carrier and includes a marginal portion 18 which extends at an angle to the vertical arm 17. The horizontal arm 16 has attached thereto a rail 19 which is formed with races for bearing balls, and an abutment rail 20 is rigidly connected to the rail 19. A C-shaped support rail 22 is supported on rows of bearing balls 21 which are, in turn, supported on the rail 19, and the abutment rail 20 prevents the support rail 22 from lifting from the bearing balls 21.

A toothed rack 23 is rigidly connected to the support rail 22, such as by welding, and has major surfaces which extend substantially vertically and a row of teeth which is provided at the lower region of the toothed rack 23. The toothed rack 23 engages, with a small play, underneath the above-mentioned marginal portion 18 of the vertical arm 17.

A riveting sleeve 24 attaches a support plate 25 to the carrier rail 15 or, more particularly, to the vertical arm 17 thereof, and a support 26 is arranged adjacent to the support plate 25 and is connected to the guiding rail 15 by means of screws 27. The screw 27 which is arranged at the right end in the illustration of FIGS. 1 and 2 also fixes an end of the support plate 25. The support 26 is provided only on one of the carrier rails 15 which constitute the mounting and guiding arrangement for the seat element. In addition thereto, there may be provided, at the carrier rail 15 associated with the other lateral region of the seat, a shortened support plate which is somewhat similar to the support plate 25 and serves the same purpose.

An electromotor 29 and a transmission 28 driven by the same are supported on the support 26. The motor 29 has an output shaft 30 on which there is mounted a pinion 31 which meshes with a larger-diameter toothed wheel 32 which is connected for joint rotation to a smaller pinion 33 and to a larger pinion 34. The three gears 32, 33 and 34 are jointly supported in the support plate 25 and in the support 26 for rotation.

A large-diameter gear 35 meshes with the pinion 33, and is mounted on a stub shaft 37 for joint rotation therewith and secured thereon against displacement axially thereof by a spring ring 36. The stub shaft 37 is rotatably supported in a bushing 38 which is connected to the support plate 25, such as by riveting. The stub shaft 37 is supported by the bushing 38 for rotation and carries a pinion 40 on its end portion 39 which extends outwardly of the bushing 38, the pinion 40 meshing with the row of teeth 14 of the rack 12.

A tubular shaft 41 extends from the stub shaft 37 to the other lateral region of the seat element and is connected to the stub shaft 37 for joint rotation therewith so as to drive a pinion 42 corresponding to the pinion 40 but arranged on the other lateral region of the seat element, jointly with the pinion 40. Here again, the pinion 42 meshes with a further rack 12 which is arranged at the same lateral region of the seat element as the pinion 42. The pinion 42 is mounted on the stub shaft 43, and the tubular shaft 41 is coupled to the stub shaft 43 for joint rotation.

The pinion 34 meshes with an intermediate gear 45 which is rotatable on a support shaft 46 which is stationarily connected to the support plate 25, such as by riveting. A gear 47 meshes with the intermediate gear 45 and is mounted for joint rotation on a stub shaft 48 which is mounted in a bushing 24 for rotation therein. The stub shaft 48 carries, on its end which extends outwardly of the bushing 24, a pinion 49 which is connected to the stub shaft 48 for joint rotation, for instance, by riveting. The pinion 49 meshes with the rack 23.

The stub shaft 48 is coupled, for joint rotation, with a stub shaft 51 located at the other lateral side of the seat element, by means of a tubular shaft 50. The stub shaft 51 has connected thereto for joint rotation a pinion 52 arranged at the other lateral region of the seat element, the pinion 52 meshing with another rack which corresponds to the above-discussed rack 23 arranged at the first-mentioned lateral region of the seat element.

As a result of the above-discussed arrangement, the pinions 40 and 42, on the one hand, and the pinions 49 and 52, on the other hand, are driven at the same angular speeds and, therefore, the adjusting forces act, in the same manner, on both of the lateral regions of the seat element on the corresponding racks 12 or 23. The adjusting movements of the seat element which are brought about by the pinion pairs 40, 42, on the one hand and 49, 52 on the other hand, occur simultaneously and synchronously, and these movements are performed in a predetermined invariable proportion to one another as a result of the fact that the initial members 33, 34 of the two branches of the transmission 28 are coupled to one another for joint rotation.

When the seat element is being displaced from its rear position illustrated in FIGS. 1 and 2, what will happen is that, on the one hand, the support rail 22, together with the seat element which is connected thereto, will be displaced along the guiding arrangement constituted by the two carrier rails 15 while on the other hand the orientation of the elongation of the carrier rails 15 will be varied by tilting the carrier rails 15 along a vertical plane due to the meshing of the driving pinions 40 and 42 with the corresponding, substantially vertically oriented racks 12. This results in a situation where the support rails 15, together with the motor 29 and the driving section of the transmission 28 carried by the carrier rails 15 will change their vertical position with respect to the stationary racks 12. The vertical tilting movement of the carrier rails 15 about the pivot axis of the pivots 11 changes the elevation of the seat element, especially of its rear region, in dependence on the longitudinal position of the seat element relative to the carrier rails 15.

It will be understood that each of the elements described above, or two or more together, may also find a useful application in other types of constructions differing from the types described above.

While the invention has been illustrated and described as embodied in an adjustable seat for use in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motor driven seat adjuster, particularly for use in a vehicle, a combination comprising a guide rail assembly including a seat rail secured to the seat; a carrier rail movably supporting said seat rail and being pivotally connected at one end thereof to the floor of the vehicle; displacing means including longitudinally directed advancing means attached to said seat rail; tilting means attached to the vehicle floor in operative proximity to the other end of said carrier rail; a driving motor secured to said carrier rail; and coupling means arranged on said carrier rail for coupling said motor to said advancing means and to said tilting means to simultaneously displace said seat rail relative to said carrier rail and said other end of said carrier rail relative to the vehicle floor.

2. A combination as defined in claim 1, wherein said coupling means includes a transmission interposed between said motor and said advancing and tilting means, respectively, and operative for jointly and simultaneously displacing both said advancing and tilting means.

3. A combination as defined in claim 2, wherein said transmission includes a driving section having a driving pinion and said advancing means includes a driven rack attached to said support rail for shared displacement therewith; and wherein said driving pinion and said rack mesh with one another.

4. A combination as defined in claim 3, wherein said driving section further includes an additional driving pinion also mounted on said carrier; and wherein said tilting means further includes a stationary upright support and an additional driven rack rigid with said support and extending substantially vertically, said additional driving pinion meshing with said additional driven rack.

5. A combination as defined in claim 4, wherein said additional driven rack is curved and has a center of curvature located at the pivot point of said carrier rail.

6. A combination as defined in claim 5, wherein said support has an elongated slot therein; and wherein said additional driven rack is arranged at one side of said slot and delimits the same.

7. A combination as defined in claim 4, wherein said mounting means and said displacing means are arranged respectively at both lateral regions of said seat, and means for synchronously operating said advancing means and said tilting means of said displacing means.

8. A combination as defined in claim 7, wherein said operating means includes a first shaft common to said driving pinions engaging the advancing means, and a second shaft common to said additional driving pinions engaging both tilting means.

9. A combination as defined in claim 4, wherein said driving section of said transmission includes a reduction gear pair; two gear wheels driven by said reduction gear pair and coupled with one another for joint rotation; a first auxiliary gear jointly rotatable with said additional driving pinion and driven by one of said two gear wheels; a second auxiliary gear driven by the other of said two gear wheels; a third auxiliary gear wheel jointly rotatable with said driving pinion; said second auxiliary gear interposed between and meshing with said other of said two gear wheels and said third auxiliary gear wheel.

10. A combination as defined in claim 3; and further comprising a support extension rigid with said carrier rail and embracing said driven rack at a region of meshing with said driving pinion and operative for maintaining said driven rack in a meshing engagement with said driving pinion.

11. A combination as defined in claim 10, wherein said driven rack has an abutment surface extending longitudinally thereof and facing away from said driving pinion; and wherein said support extension has an abutment portion which is juxtaposed with said abutment surface at said meshing region.

* * * * *